US008360840B2

(12) United States Patent
Bennett

(10) Patent No.: US 8,360,840 B2

(45) Date of Patent: Jan. 29, 2013

(54) GAMING MACHINE WITH ENHANCED FEATURE INDICATOR

(75) Inventor: Nicholas Luke Bennett, Rosebery (AU)

(73) Assignee: Aristocrat Technologies Australia Pty Ltd (AU)

( * ) Notice: Subject to any disclaimer, the term of this patent is extended or adjusted under 35 U.S.C. 154(b) by 1287 days.

(21) Appl. No.: 10/752,773

(22) Filed: Jan. 6, 2004

(65) Prior Publication Data

US 2005/0261051 A1 Nov. 24, 2005

(30) Foreign Application Priority Data

Jan. 14, 2003 (AU) ................................ 2003900134

(51) Int. Cl.
*A63F 13/00* (2006.01)

(52) U.S. Cl. ........................................... 463/16; 463/30

(58) Field of Classification Search .................... 463/16, 463/20, 21, 30, 31; 273/138.1, 143 R
See application file for complete search history.

(56) References Cited

U.S. PATENT DOCUMENTS

| | | | | |
|---|---|---|---|---|
| 6,053,813 | A | 4/2000 | Mathis | 463/26 |
| 6,251,013 | B1 * | 6/2001 | Bennett | 463/13 |
| 6,632,140 | B2 * | 10/2003 | Berman et al. | 463/20 |
| 7,121,942 | B2 * | 10/2006 | Baerlocher | 463/20 |
| 2002/0132659 | A1 | 9/2002 | DeMar et al. | 463/16 |

FOREIGN PATENT DOCUMENTS

| | | |
|---|---|---|
| NZ | 510297 | 8/2002 |
| WO | WO 00/32286 | 6/2000 |
| WO | WO 02/07836 A1 | 1/2002 |

* cited by examiner

*Primary Examiner* — David L Lewis
*Assistant Examiner* — Robert Mosser
(74) *Attorney, Agent, or Firm* — McAndrews, Held & Malloy, Ltd.

(57) ABSTRACT

A gaming machine 10 has a display 14 and a game controller arranged to control images of symbols displayed on the display 14. The game controller is arranged to play a game 16 wherein at least one random event is caused to be displayed on the display and, if a predefined winning event occurs, the machine 10 awards a prize. The gaming machine 10 comprises a bonus feature that is triggered when a trigger condition occurs in a base game and an indicator incorporated in the bonus feature indicates to the player that the chance of winning during the bonus feature is higher than in the base game that triggered the bonus feature.

21 Claims, 4 Drawing Sheets

GAMING MACHINE WITH ENHANCED FEATURE INDICATOR

FIELD OF THE INVENTION

This invention relates to a gaming machine. More particularly, the invention relates to a gaming machine and to an improvement to a game played on such a gaming machine.

BACKGROUND TO THE INVENTION

Players who regularly play gaming machines quickly tire of particular games and therefore it is necessary for manufacturers of these machines to develop innovative game features which add interest to the games. In so doing, it is hoped to keep players amused and therefore willing to continue playing the game as well as to attract new players.

Also, with the growth that has occurred in the gaming machine market, there is intense competition between manufacturers to supply various existing and new venues. When selecting a supplier of gaming machines, the operator of a venue will often pay close attention to the popularity of various games with their patrons. Therefore, gaming machine manufacturers are keen to devise games and/or game features which are popular with the players as a mechanism for improving sales, retaining customers and attracting new customers.

Still further, these days it is becoming increasingly common to provide bonus features associated with games to enhance player enjoyment and to maintain player interest. These features are becoming increasingly complex to the extent that gaming machines these days often have “Help” screens to explain to players how the features operate and what they entail. A large percentage of players do not have the inclination to read such screens and would rather just play the game. Hence such screens could be a disincentive to a player to play that particular gaming machine. This could have adverse consequences for the revenue of an operator of the venue in which the gaming machine is installed.

SUMMARY OF THE INVENTION

According to a first aspect of the invention, there is provided a gaming machine having a display and a game controller arranged to control images of symbols displayed on the display, the game controller being arranged to play a game wherein at least one random event is caused to be displayed on the display and, if a predefined winning event occurs, the machine awards a prize, the gaming machine comprising a bonus feature that is triggered when a trigger condition occurs in a base game and an indicator incorporated in the bonus feature that indicates to the player that the chance of winning during the bonus feature is higher than in the base game that triggered the bonus feature.

Preferably, the format of the bonus feature is the same as that of the base game apart from the indicator incorporated in the bonus feature. Thus, the base game may be a spinning reel game with the bonus feature being a series of free spinning reel games.

The indicator may be a variable device that indicates to the player that, as the bonus feature, i.e. the series of free games, progresses, the potential return to player percentage increases. The indicator may be related to the occurrence of a special symbol on the display of the gaming machine during play of the bonus feature. More particularly, the indicator may be the quantity of a special symbol that occurs during the bonus feature, i.e. on at least one of the reels of the games of the series of free games. The occurrence of the special symbol may increase on the at least one reel as the bonus feature, being the series of free games, progresses.

The controller may provide the variability of the indicator by causing a special symbol to be added in respect of each event of the bonus feature. Each event may be one of the free games and one special symbol may be added in respect of each free game, eg. prior to the free game. Instead, the special symbol may only be added after completion of a predetermined number of events in the bonus feature, i.e. after a predetermined number of free games of the series of free games. Still further, the special symbol may be added randomly or upon the occurrence of some outcome in the bonus feature.

As indicated above, the base game may be a spinning reel game and the bonus feature may be a series of free spinning reel games and the special symbol may be added to at least one of a plurality of reel strips so that the at least one reel strip increases in length. Instead, the special symbol may be added in substitution for existing symbols on at least one of a plurality of reel strips so that the at least one reel strip retains the same length as the other reel strips. Thus, the special symbol may be added to a middle reel strip of a five reel game or, instead, the special symbol may be added to each of a plurality of the reel strips, eg. the second, third, fourth and fifth reel strips of the game.

The special symbol may be a substitute symbol. The substitute symbol may, for example, occur on a middle reel such as the third reel of a five reel game. With the occurrence of an increasing number of substitute symbols during the series of free games, the chances of obtaining a prize winning combination with the substitute symbol substituting are increased.

Preferably, any additional substitute symbol is positioned adjacent a prior occurrence of the substitute symbol on the reel strip so that it becomes, visually, readily apparent to the player that at least one further substitute symbol has been added.

According to a second aspect of the invention, there is provided a method of operating a gaming machine, the gaming machine having a display and being controlled by a game controller arranged to control images displayed on the display, the method comprising triggering a bonus feature when a trigger condition occurs in a base game and incorporating an indicating means in the bonus feature to indicate to the player that a potential return to player percentage of the bonus feature is higher than that which is applicable in the base game that triggered the bonus feature.

The gaming machine is to be understood to include a gaming apparatus that does not require the wagering of a stake in order to play the game and further includes apparatus which is connectable to a network.

The format of the bonus feature may be the same as that of the base game apart from the indicator incorporated in the bonus feature.

The method may include implementing the indicator as a variable device that indicates to the player that, as the bonus feature progresses, the potential return to player percentage increases. More particularly, the method may include relating the indicator to the occurrence of a special symbol on the display during play of the bonus feature.

The indicator may be the quantity of a special symbol occurring during the bonus feature and the method may include increasing the occurrence of the special symbol as the bonus feature progresses.

The method may include providing the variability of the indicator by causing a special symbol to be added in respect of each event of the bonus feature.

Thus, the method may include adding the special symbol after completion of a predetermined number of events in the bonus feature. Instead, the method may include adding the special symbol randomly or upon the occurrence of some outcome in the bonus feature.

The game includes a base game which is a spinning reel game and the bonus feature may be a series of free spinning reel games and the method may include adding a special symbol to at least one of a plurality of reel strips so that the at least one reel strip increases in length. Instead, the method may include adding the special symbol in substitution for existing symbols on at least one of a plurality of reel strips so that the at least one reel strip retains the same length as the other reel strips.

The special symbol may be a substitute symbol. The method may include positioning any additional substitute symbol adjacent a prior occurrence of the substitute symbol on the reel strip so that it becomes, visually, readily apparent to the player that at least one further substitute symbol has been added.

BRIEF DESCRIPTION OF THE DRAWINGS

An embodiment of the invention is now described by way of example with reference to the accompanying diagrammatic drawings in which:—

DETAILED DESCRIPTION OF THE PREFERRED EMBODIMENT

Figure 1:
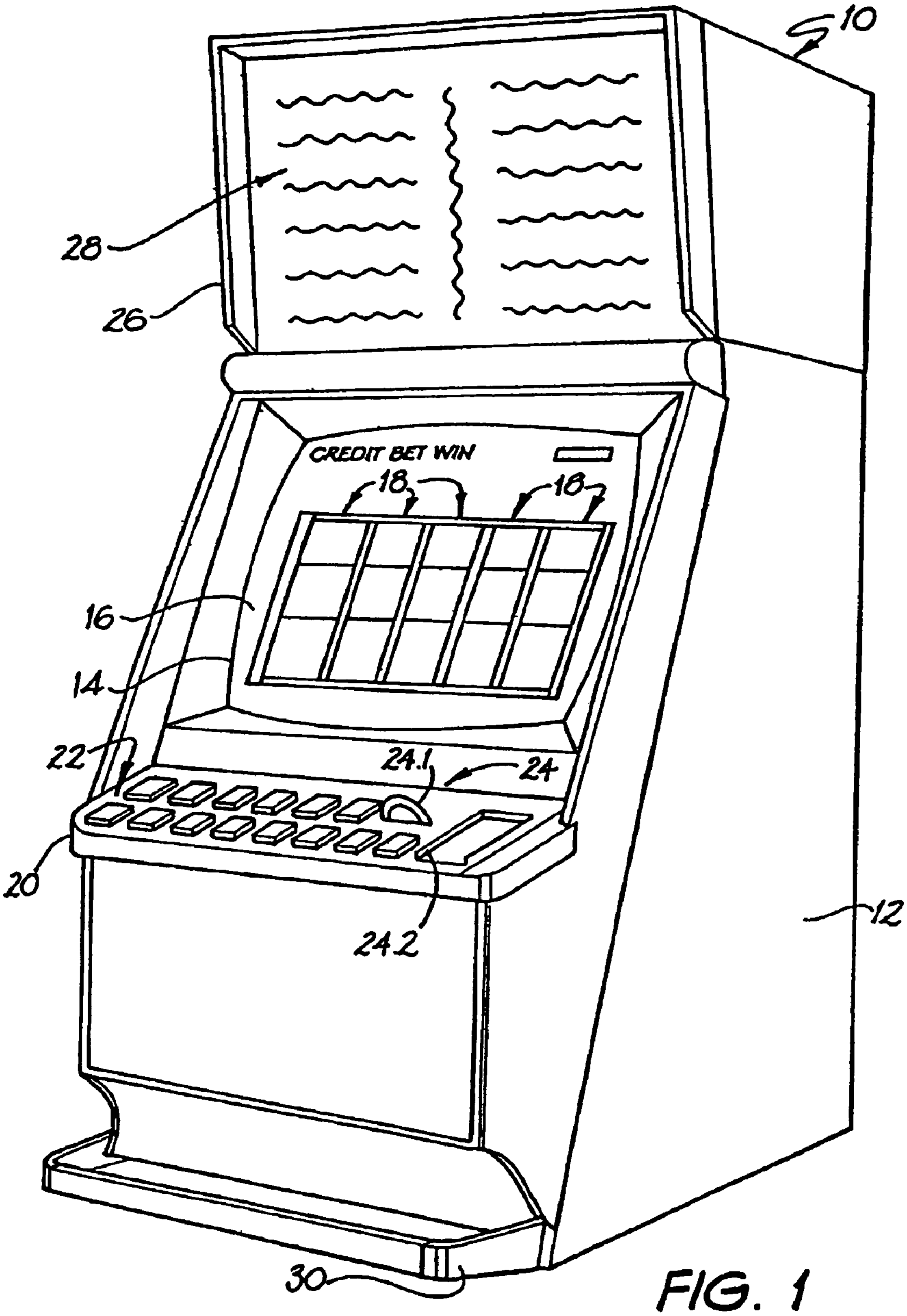
FIG. 1 shows a perspective view of a gaming machine, in accordance with the invention.

In FIG. 1, reference numeral 10 generally designates a gaming machine, including a game, in accordance with an embodiment of the invention. The machine 10 includes a console 12 having a display means in the form of a video display unit 14 on which a game 16 is played, in use. The video display unit 14 may be implemented as a cathode ray screen device, a liquid crystal display, a plasma screen, or the like. The game 16 is a spinning reel game which simulates the rotation of a number of spinning reels 18. A midtrim 20 of the machine 10 houses a bank 22 of buttons for enabling a player to play the game 16. The midtrim 20 also houses a credit input mechanism 24 including a coin input chute 24.1 and a bill collector 24.2.

The machine 10 includes a top box 26 on which artwork 28 is carried. The artwork 28 includes paytables, details of bonus awards, etc.

A coin tray 30 is mounted beneath the console 12 for cash payouts from the machine 10.

Figure 2:
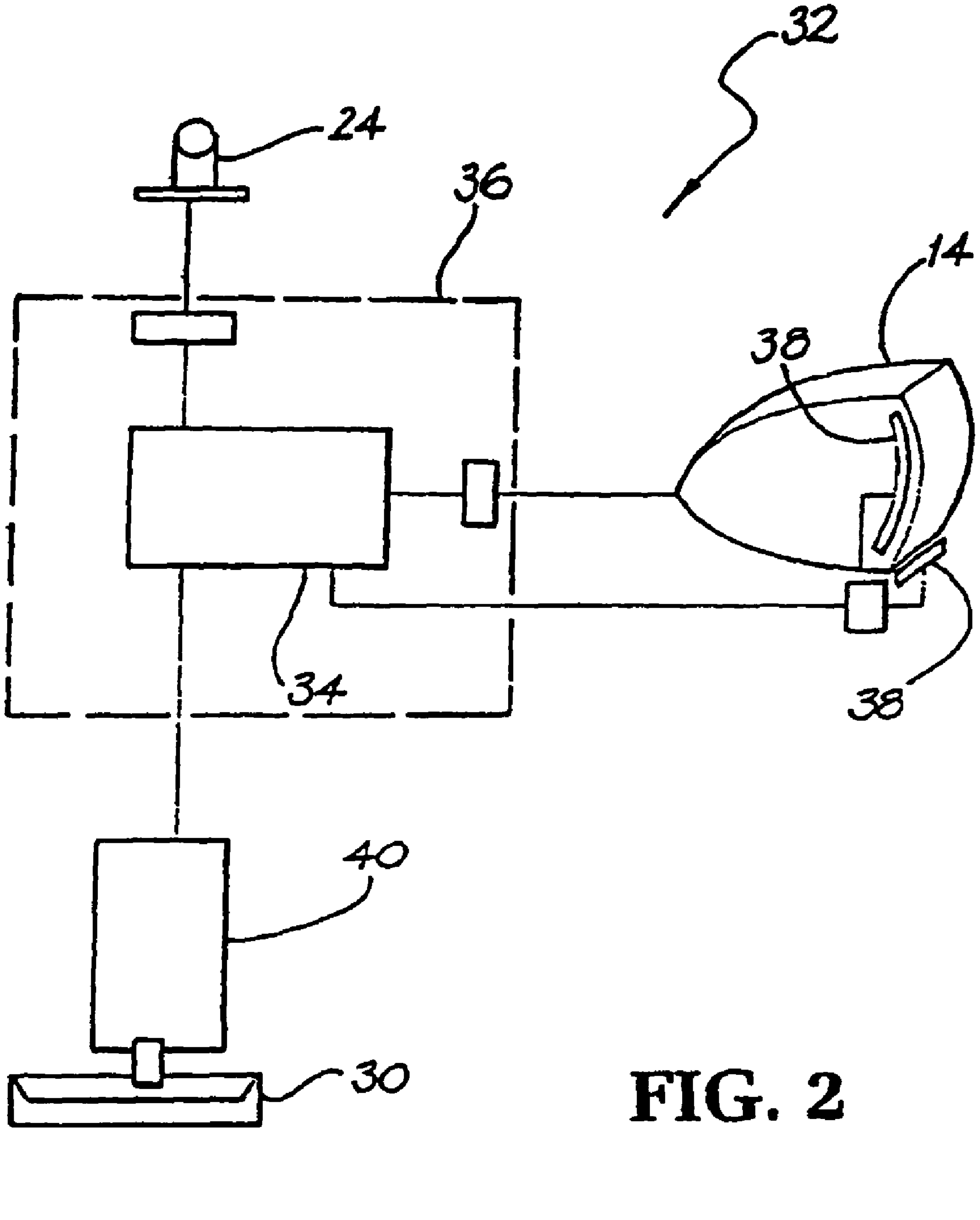
FIG. 2 shows a block diagram of a control circuit of the gaming machine.

Referring to FIG. 2 of the drawings, a control means or control circuit 32 is illustrated. A program which implements the game and user interface is run on a processor 34 of the control circuit 32. The processor 34 forms part of a controller 36 that drives the screen of the video display unit 14 and that receives input signals from sensors 38. The sensors 38 include sensors associated with the bank 22 of buttons and touch sensors mounted in the screen of the video display unit 14. The controller 36 also receives input pulses from the mechanism 24 to determine whether or not a player has provided sufficient credit to commence playing. The mechanism 24 may, instead of the coin input chute 24.1 or the bill collector 24.2, or in addition thereto, be a credit card reader (not shown) or any other type of validation device.

Finally, the controller 36 drives a payout mechanism 40 which, for example, may be a coin hopper for feeding coins to the coin tray 30 to make a pay out to a player when the player wishes to redeem his or her credit.

The game 16 played on the gaming machine 10 is a spinning reel game having five reels 18. Further, the game 16 includes a bonus feature where, upon the occurrence of a predetermined trigger condition in a base game of the game 16, a series of free games is awarded.

The bonus feature includes an indicator, as will be described in greater detail below, which clearly indicates to a player that the potential return to player percentage in the bonus feature is higher than that which is applicable in respect of the base game of the game 16.

In the description which follows, it is assumed that wins, both in the base game and in the free games of the bonus feature, pay from left-to-right.

For the game 16 described in this example, it is assumed that the set of symbols applicable to the reel strips is as follows:

DIAMOND (substitute)
SYM_A
SYM_B
SYM_C
A
K
Q
10
9
S (scatter)

The DIAMOND symbol 58 (FIG. 4) is a substitute symbol which substitutes for all other symbols, apart from scatters in making up winning combinations.

For each symbol, apart from the DIAMOND symbol 58, there will be a paytable of prizes that applies for certain winning combinations. For example, 5 SYM_A on a payline pays 500 credits (multiplied by the bet per line), 4 SYM_A appearing in a left-to-right combination pays 100 credits (multiplied by the bet per line) and so on. Similarly, 5 scatter symbols S (the scatter symbol) appearing anywhere on the screen pays 20 credits (multiplied by the total bet), 4 scatter symbols S appearing anywhere on the screen pays 15 credits (multiplied by the total bet) and so on. The occurrence of at least 3 scatter symbols S also functions as a trigger condition to award the bonus feature, as will be described below.

For each winning payline combination, one of the applicable symbols may be substituted by the DIAMOND symbol 58 to make up the winning combination.

The simplified reel strips for the reels 18 for the base game of the game 16 are as follows:

| Position | Reel 1 | Reel 2 | Reel 3 | Reel 4 | Reel 5 |
|---|---|---|---|---|---|
| 1 | SYM_A | SYM_B | SYM_C | 10 | A |
| 2 | A | K | K | SYM_A | SYM_C |
| 3 | K | 9 | 9 | Q | J |
| 4 | SYM_B | SYM_C | A | A | 10 |
| 5 | Q | Q | 10 | 10 | 9 |
| 6 | DIA-MOND | DIA-MOND | DIA-MOND | DIA-MOND | DIA-MOND |
| 7 | 10 | A | 9 | Q | A |

-continued

| Position | Reel 1 | Reel 2 | Reel 3 | Reel 4 | Reel 5 |
|---|---|---|---|---|---|
| 8 | A | 9 | SYM_A | SYM_C | SYM_C |
| 9 | 9 | SYM_A | K | K | Q |
| 10 | SYM_C | SYM_A | SYM_B | A | SYM_A |
| 11 | 10 | SYM_A | Q | SYM_B | A |
| 12 | J | SYM_A | 10 | Q | K |
| 13 | A | 10 | K | J | SYM_C |
| 14 | 10 | J | J | A | J |
| 15 | SCAT | SCAT | SCAT | SCAT | SCAT |
| 16 | 9 | 10 | 9 | 9 | A |
| 17 | 10 | A | 10 | Q | SYM_B |
| 18 | A | 9 | K | SYM_B | J |
| 19 | 9 | 10 | 9 | K | SYM_C |
| 20 | J | A | 10 | A | J |

Hence, the base game of the game 16 may have some occurrences of the same symbol positioned next to each other for visual effect such as, in the case of reel strip 2, four occurrences of the top award symbol, SYM_A, are arranged next to one another in positions 9-12.

As indicated above, the occurrence of three scatter symbols S in the base game of the game 16 triggers the bonus feature being, as described above, a series of ten free games.

Figure 3:
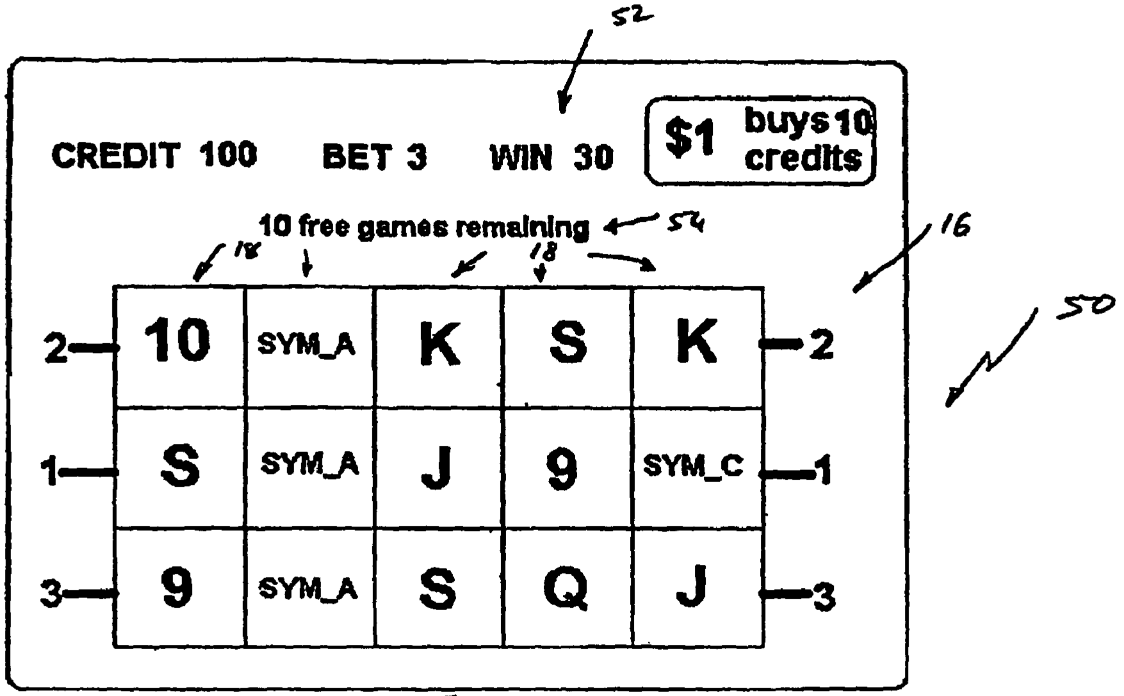
FIG. 3 shows a screen display after a base game of a game played on the gaming machine of FIG. 1.

FIG. 3 of the drawings shows a screen display 50 of the base game where it is assumed that the reels 18 have stopped at reel strip positions 15, 11, 14, 16 and 13, respectively, on the first payline.

The occurrence of the three scatter symbols S results in a win of ten credits (multiplied by three credits being the total bet) for a total win of thirty credits. This is displayed on a win meter 52 of the gaming machine 10.

A message 54 is displayed on the screen display indicating that the bonus feature has been awarded and that ten free games are remaining.

Prior to each free game of the series of free games, one DIAMOND symbol 58 (FIG. 4) is added to the third reel strip. The additional DIAMOND symbol 58 is added adjacent another occurrence of the DIAMOND symbol 58 on the third reel strip. Accordingly, prior to the first free game, the reel strips will change to the following:

| Position | Reel 1 | Reel 2 | Reel 3 | Reel 4 | Reel 5 |
|---|---|---|---|---|---|
| 1 | SYM_A | SYM_B | SYM_C | 10 | A |
| 2 | A | K | K | SYM_A | SYM_C |
| 3 | K | 9 | 9 | Q | J |
| 4 | SYM_B | SYM_C | A | A | 10 |
| 5 | Q | Q | 10 | 10 | 9 |
| 6 | DIA-MOND | DIA-MOND | DIA-MOND | DIA-MOND | DIA-MOND |
| 7 | 10 | A | DIA-MOND | Q | A |
| 8 | A | 9 | 9 | SYM_C | SYM_C |
| 9 | 9 | SYM_A | SYM_A | K | Q |
| 10 | SYM_C | SYM_A | K | A | SYM_A |
| 11 | 10 | SYM_A | SYM_B | SYM_B | A |
| 12 | J | SYM_A | Q | Q | K |
| 13 | A | 10 | 10 | J | SYM_C |
| 14 | 10 | J | K | A | J |
| 15 | SCAT | SCAT | J | SCAT | SCAT |
| 16 | 9 | 10 | SCAT | 9 | A |
| 17 | 10 | A | 9 | Q | SYM_B |
| 18 | A | 9 | 10 | SYM_B | J |
| 19 | 9 | 10 | K | K | SYM_C |
| 20 | J | A | 9 | A | J |
| 21 | | | 10 | | |

That is, reel strip 3 has been extended by one position and a further DIAMOND symbol 58 has been inserted at position 7 adjacent to the other occurrence of the DIAMOND symbol 58 on the third reel strip.

Figure 4:
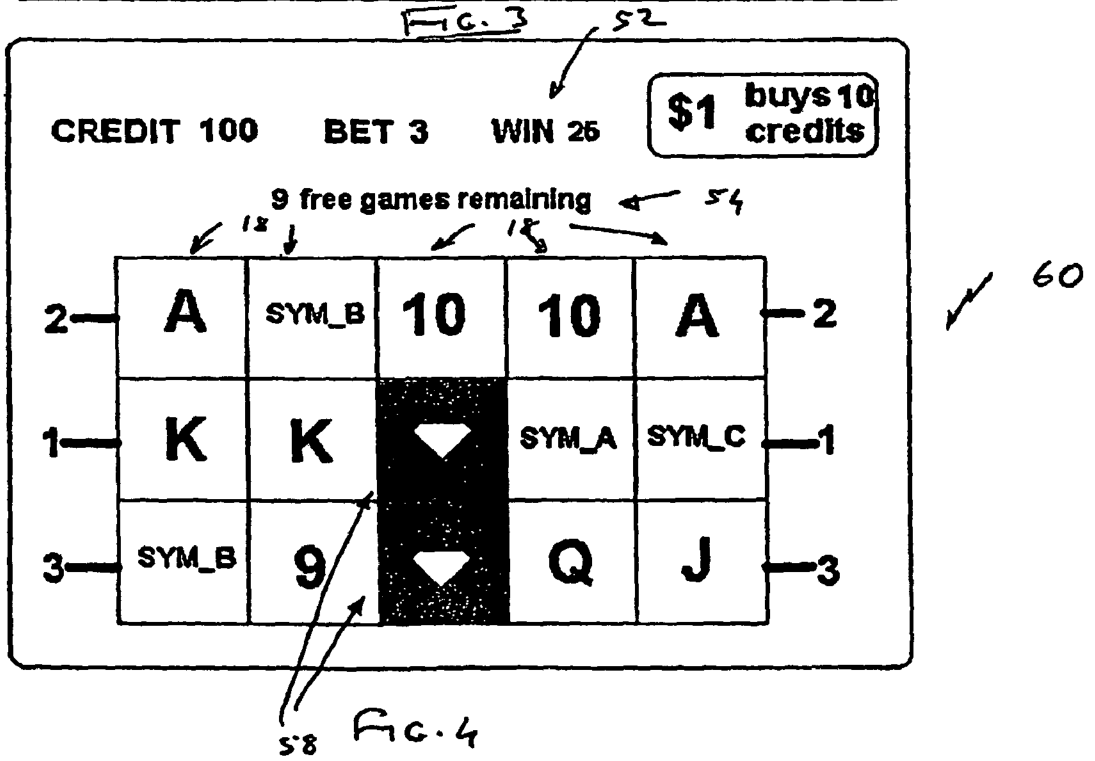
FIG. 4 shows a screen display after a first game of a bonus feature of the game following the base game.
Figure 5:
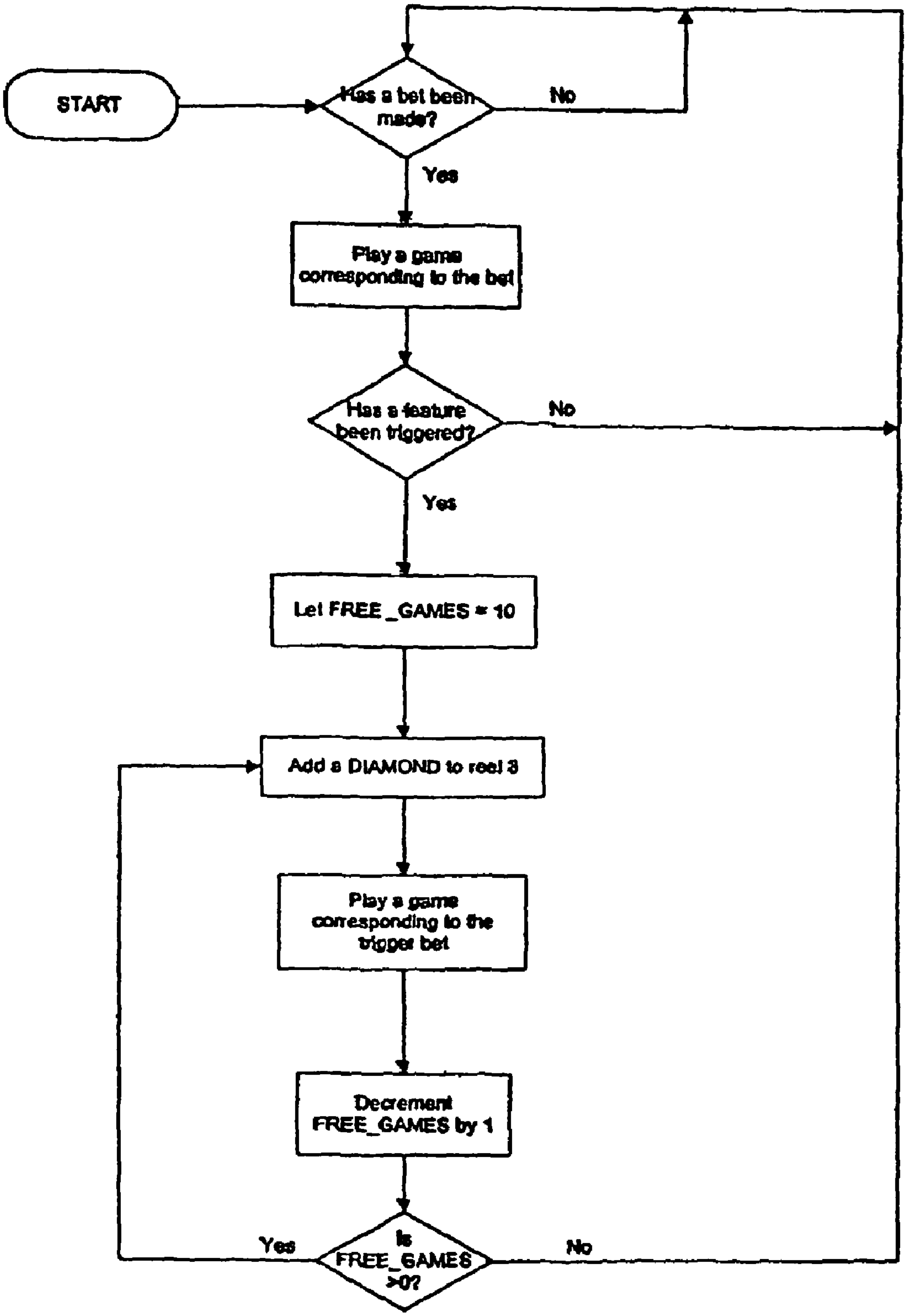
FIG. 5 shows a flow chart of the game, including the bonus feature.

Assuming that in the first free game the reels 18 stop at reel strip positions 3, 2, 6, 2 and 2, the screen display is as shown in FIG. 4 of the drawings and is designated generally by the reference numeral 60.

For the winning combination of 3×K (with the DIAMOND symbol 58 substituting) on payline 1, a prize of 25 credits, the player playing one credit per line, is awarded and displayed on the win meter 52. There are then nine free games remaining as indicated by the message 54.

After the tenth free game, ten additional DIAMOND symbols 58 have been added to the third reel strip so that the reel strips now appear as follows:

| Position | Reel 1 | Reel 2 | Reel 3 | Reel 4 | Reel 5 |
|---|---|---|---|---|---|
| 1 | SYM_A | SYM_B | SYM_C | 10 | A |
| 2 | A | K | K | SYM_A | SYM_C |
| 3 | K | 9 | 9 | Q | J |
| 4 | SYM_B | SYM_C | A | A | 10 |
| 5 | Q | Q | 10 | 10 | 9 |
| 6 | DIA-MOND | DIA-MOND | DIA-MOND | DIA-MOND | DIA-MOND |
| 7 | 10 | A | DIA-MOND | Q | A |
| 8 | A | 9 | DIA-MOND | SYM_C | SYM_C |
| 9 | 9 | SYM_A | DIA-MOND | K | Q |
| 10 | SYM_C | SYM_A | DIA-MOND | A | SYM_A |
| 11 | 10 | SYM_A | DIA-MOND | SYM_B | A |
| 12 | J | SYM_A | DIA-MOND | Q | K |
| 13 | A | 10 | DIA-MOND | J | SYM_C |
| 14 | 10 | J | DIA-MOND | A | J |
| 15 | SCAT | SCAT | DIA-MOND | SCAT | SCAT |
| 16 | 9 | 10 | DIA-MOND | 9 | A |
| 17 | 10 | A | 9 | Q | SYM_B |
| 18 | A | 9 | SYM_A | SYM_B | J |
| 19 | 9 | 10 | K | K | SYM_C |
| 20 | J | A | SYM_B | A | J |
| 21 | | | Q | | |
| 22 | | | 10 | | |
| 23 | | | K | | |
| 24 | | | J | | |
| 25 | | | SCAT | | |
| 26 | | | 9 | | |
| 27 | | | 10 | | |
| 28 | | | K | | |
| 29 | | | 9 | | |
| 30 | | | 10 | | |

Accordingly, as the free games progress, the player's chances of winning are greatly increased because of the higher chance of getting a substitute symbol on the third reel strip. The DIAMOND symbol 58 is designed to stand out from the remaining symbols on the reels 18 so that, as the reels 18 spin, the player has a readily identifiable visual effect of seeing the DIAMOND symbols 58 spinning past. Hence, as extra DIAMOND symbols 58 are added to the third reel, the player has the visual confirmation that the potential return to player percentage is increasing due to the increased number of DIAMOND symbols 58 spinning past. It will be appreciated that, by the later games of the series of free games, there is a very high chance of one or more DIAMOND symbols 58 being displayed when the third reel 18 stops spinning.

Instead of the reel strip associated with the third reel 18 being increased in length by the addition of further DIAMOND symbols 58, the reel strip associated with the third reel 18 could remain the same length as the other reel strips by substituting the DIAMOND symbol 58 for other symbols presently on the reel strip of the third reel 18.

In another embodiment of the invention (not shown), additional DIAMOND symbol 58 are added to each of the second, third, fourth and fifth reels 18 as the free games of the series of free games progresses therefore increasing the likelihood of a winning outcome being obtained even further, particularly, in the later games of the series of free games.

It is also not necessary that the positioning of the other symbol on the reel strips remain completely constant during all the free games of the series of free games. Their distribution may alter.

It is a particular advantage of the invention that an indicator is provided which readily indicates to a player that the potential return to player percentage for the free game is higher and increases during the bonus feature. Hence, the player need not, if the player does not wish to do so, consult a "Help" screen of the gaming machine 10 to ascertain how the bonus feature works. The applicant believes that this will enhance player enjoyment of the game. It will also enhance revenue for operators of a venue in which the gaming machine 10 is installed as players will be less reticent about playing the game if they know, in a simplified manner, how the bonus feature works and that it is not necessary to consult a "Help" screen should they not wish to do so.

Another major benefit of the invention is that, as the bonus feature progresses, the chances of winning increases. Hence, the last impression that is left in the mind of the player is likely to be a good one as the player is more likely to end the feature with one or more winning games and higher payouts than non-winning games and lower payouts.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

I claim:

1. A method of operating a gaming machine having a display and a game controller arranged to control images of symbols displayed on the display, the game controller being arranged to play a spinning reel game wherein at least one random event is caused to be displayed on the display and, if a predefined winning event occurs, the machine awards a prize, the method comprising:

- triggering a bonus feature, said bonus feature including a series of free spinning reel games, each of said free spinning reel games having associated reel strips carrying a number of symbols including a winnable symbol;
- before playing each of said free spinning reel games, inserting a said winnable symbol into one of the reel strips while not increasing said number of symbols on the other of said reel strips to increase the chance of a said winnable symbol being spun up in a said free spinning reel game, said inserting creating a stacked array of a plurality of said winnable symbols; and
- spinning said reel strips to provide a visible indication of said increase in the chance of a said winnable symbol being part of a winning event during a free spinning reel game.

2. A method according to claim 1 in which the base game has associated reel strips carrying a plurality of symbols, and at least one instance of said winnable symbol is included in at least one of the reel strips.

3. A method according to claim 1 in which said winnable symbol is at least one of a substitute symbol, a wild symbol, and a paytable symbol.

4. The method of claim 1, wherein said inserting comprising positioning said winnable symbol adjacent to another said winnable symbol on said one reel strip if said another said winnable symbol is present on said one reel strip.

5. A method according to claim 1 which comprises progressively adding another said winnable symbol to one of the plurality of reel strips as the series of free games progresses to accumulatively and visibly increase the chance of a said winnable symbols being part of a winning event as play of the free games progresses.

6. A method according to claim 5 wherein, for each free game in the series, said winnable symbol is added to at least one of the reel strips.

7. A method according to claim 5 in which, for the series of free games, at least one said winnable symbol is progressively added to each reel strip.

8. A method according to claim 5 which comprises progressively adding another said winnable symbol to a reel strip which already has at least one pre-existing symbol to create a stacked array of said one symbols.

9. A method according to claim 8 in which, for the series of free games, at least one said winnable symbol is progressively added to the same reel strip to create a single stacked array of said one symbols.

10. A gaming machine having a display and a game controller programmed to control images of symbols displayed on the display, and to play a spinning reel game wherein at least one random event is caused to be displayed on the display and, if a predefined winning event occurs, the game controller causes the machine to award a prize, the game controller being further programmed to:

- trigger a bonus feature, said bonus feature including a series of free spinning reel games, each of said free spinning reel games having associated reel strips carrying a number of symbols including a winnable symbol;
- before playing each of said free spinning reel games, insert a said winnable symbol into one of the reel strips while not increasing said number of symbols on the other reel strips to increase the chance of said winnable symbol being spun up in a said free spinning game, and to create a stacked array of a plurality of said winnable symbols; and
- spin said reel strips to provide a visible indication of said increase in the chance of a said winnable symbol being part of a winning event during a free spinning reel game.

11. A gaming machine according to claim 10, wherein the game controller is programmed to provide the base game with associated reel strips carrying a plurality of symbols, and at least one instance of said winnable symbol is included in at least one of the reel strips.

12. A gaming machine according to claim 10 in which said winnable symbol is at least one of a substitute symbol, a wild symbol, and a paytable symbol.

13. The gaming machine of claim 10, wherein said game controller further positions said winnable symbol adjacent to another said winnable symbol on said one reel strip if said another said winnable symbol is present on said one reel strip.

14. A gaming machine according to claim 10, wherein the game controller is further programmed to progressively add another said winnable symbol to one of the plurality of reel strips as the series of free games progresses to accumulatively and visibly increase the chance of said winnable symbols being part of a winning event as play of the free games progresses.

15. A gaming machine according to claim 14 wherein, for each free game in the series, the game controller is programmed to add another said winnable symbol to at least one of the reel strips.

16. A gaming machine according to claim 14 in which, for the series of free games, the game controller is programmed to progressively add another said winnable symbol to each reel strip.

17. A gaming machine according to claim 14, wherein the game controller is programmed to progressively add another said winnable symbol to a reel strip which already has at least one pre-existing winnable symbol to create a stacked array of said winnable symbols.

18. A gaming machine according to claim 17 in which, for the series of free games, the game controller is programmed to progressively add another winnable symbol to the same reel strip to create a single stacked array of said winnable symbols.

19. A gaming machine having a display and a game controller programmed to control images of symbols displayed on the display, and to play a spinning reel game wherein at least one random event is caused to be displayed on the display and, if a predefined winning event occurs, the game controller causes the machine to award a prize, the game controller being further programmed to:

trigger a bonus feature, said bonus feature including a series of free spinning reel games, each of said free spinning reel games having associated reel strips carrying a number of symbols including a winnable symbol;

before playing each of said free spinning reel games, insert a said winnable symbol into one of the reel strips while not increasing said number of symbols on the other reel strips to increase the chance of said winnable symbol being spun up in a said free spinning game, and to create a stacked array of a plurality of said winnable symbols;

spin said reel strips to provide a visible indication of said increase in the chance of a said winnable symbol being part of a winning event during a free spinning reel game, and progressively insert a said winnable symbol into at least one of the plurality of reel strips as the series of free games progresses to accumulatively and visibly increase the chance of a said winnable symbols being part of a winning event as play of the free games progresses, and progressively insert a said winnable symbol into a reel strip which already has at least one pre-existing said winnable symbol to create a stacked array of winnable symbols.

20. A gaming machine according to claim 19, wherein the game controller is further programmed to add said winnable symbol to said one reel strip without replacement to increase the length of the one reel strip.

21. The gaming machine of claim 19, wherein said game controller further positions said winnable symbol adjacent to another said winnable symbol on said one reel strip if said another said winnable symbol is present on said one reel strip.

* * * * *